June 10, 1924.
H. F. WOERNLEY
1,496,962
HOSE COUPLING GASKET
Filed July 27, 1920
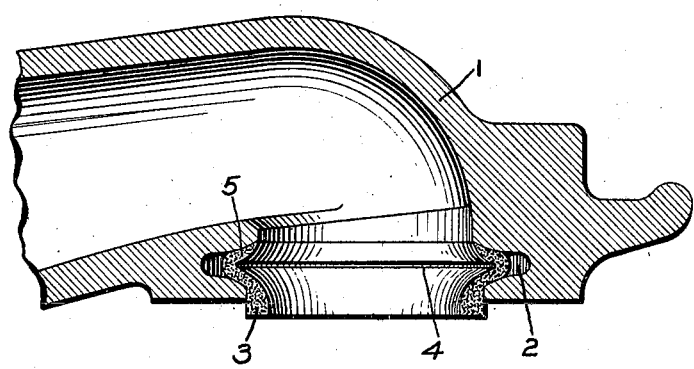
INVENTOR
HARRY F. WOERNLEY
BY Wm. M. Cady
ATTORNEY Patented June 10, 1924.

1,496,962

UNITED STATES PATENT OFFICE.

HARRY F. WOERNLEY, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

HOSE-COUPLING GASKET.

Application filed July 27, 1920. Serial No. 399,230.

*To all whom it may concern:*

Be it known that I, HARRY F. WOERNLEY, a citizen of the United States, residing at Wilkinsburg, in the county of Allegheny and State of Pennsylvania, have invented new and useful Improvements in Hose-Coupling Gaskets, of which the following is a specification.

This invention relates to gaskets, and more particularly to a gasket for a hose coupling.

The usual hose coupling gasket is provided with a flange which fits into a corresponding recess formed in the hose coupling head and dependence is placed upon the accuracy with which the flange fits the recess, together with the compressive action on the gaskets when counterpart coupling heads are coupled up, to prevent leakage around the outer walls of the gasket.

The principal object of my invention is to provide a gasket which does not require the degree of accuracy in sizing of the usual gasket and yet readily and fully prevents leakage.

In the accompanying drawing, the single figure is a fragmentary sectional view of a hose coupling head with my improved gasket applied thereto.

As shown in the drawing, the coupling head 1 is provided with an annular recess 2 having flaring walls of the same shape as heretofore employed for the ordinary gasket.

The improved gasket 3, shown fitted into the recess 2, is provided with an internal annular recess 4 in substantial alinement with the flange recess 2 and extending well into the gasket, so that the walls of the gasket are left relatively thin, the inner portion 5 of the gasket being gradually tapered to provide a very flexible section.

When not coupled, it will be noted, as shown in the drawing, that the outer faces of the gasket 3 fit snugly against the tapered walls of the gasket recess 2.

When counterpart coupling heads are coupled together, and fluid under pressure is supplied through the conduit of the coupling heads, the pressure of the fluid in the conduit acts in the recess 4 to expand the walls of the gasket and firmly press the gasket against the tapered walls of the flange recess 2, as well as tending to force the gasket outwardly and thus further into the recess 2.

The walls of the gasket being relatively thin are readily pressed against the wall of the recess 2 so as to ensure a fluid tight joint and thus prevent leakage.

By reason of this action, it is not necessary to so accurately size the gasket to the precise shape of the recess 2 in order to prevent leakage.

With the ordinary gasket, the inner wall was made flat and compression of the gasket by the coupling of counterpart heads was relied on to cause the flat wall of the gasket to engage the flaring wall of the recess and consequently, a reduction in the amount of compression, due to wear of the gasket would tend to permit leakage, by reason of the failure of the gasket wall to tightly engage the walls of the recess.

When uncoupled, the usual gasket also leaves a space between the flat wall of the gasket and the flaring wall of the recess which is liable to form a repository for dirt and moisture and thus facilitate leakage.

Having now described my invention, what I claim as new and desire to secure by Letters Patent, is:—

1. The combination with a hose coupling head having an annular recess adjacent to the conduit opening of a gasket having a flange portion fitted into and of less depth than said recess and provided with a deep annular recess in which fluid under pressure, passing through the conduit, acts to wedge the walls of the gasket into tight contact with the corresponding walls of the recess in the coupling head.

2. The combination with a hose coupling head having an annular recess adjacent to the conduit opening, of a gasket having a flange portion with relatively thin flexible walls fitted into and of less depth than said recess and provided with a deep annular recess in which fluid under pressure, flowing through the conduit, acts to tightly wedge the walls of the gasket into contact with the corresponding walls of the recess in the coupling head.

3. The combination with a hose coupling head having an annular recess with opposite flaring walls adjacent to the conduit opening, of a gasket having a flange portion partially extending into said recess with a normal contour substantially corresponding with the contour of the walls of the annular recess and provided with an annular recess extending well into the space formed by the walls of the recess in the coupling head, so that fluid under pressure passing through the coupling conduit will act in the gasket recess to wedge the walls of the flange portion against the walls of the recess in the coupling head.

In testimony whereof I have hereunto set my hand.

HARRY F. WOERNLEY.